US012628237B2

(12) United States Patent
Choi et al.

(10) Patent No.: US 12,628,237 B2
(45) Date of Patent: May 12, 2026

(54) METHOD AND APPARATUS FOR TRANSMITTING CONTROL SIGNAL USING SERVICE BASED INTERFACE IN A WIRELESS COMMUNICATION SYSTEM

(71) Applicant: Samsung Electronics Co., Ltd., Suwon-si (KR)

(72) Inventors: Jinho Choi, Suwon-si (KR); Sunhyun Kim, Suwon-si (KR); Jiyoung Cha, Suwon-si (KR); Dongmyung Kim, Suwon-si (KR); Sunwoo Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 18/397,426

(22) Filed: Dec. 27, 2023

(65) Prior Publication Data

US 2024/0244705 A1    Jul. 18, 2024

(30) Foreign Application Priority Data

Jan. 18, 2023    (KR) ......................... 10-2023-0007150

(51) Int. Cl.
H04W 76/25        (2018.01)
H04L 5/00          (2006.01)
(Continued)

(52) U.S. Cl.
CPC .......... H04W 76/25 (2018.02); H04L 5/0053 (2013.01); H04W 36/0016 (2013.01); H04W 60/04 (2013.01)

(58) Field of Classification Search
CPC . H04W 76/25; H04W 36/0016; H04W 60/04; H04W 76/10; H04W 8/22;
(Continued)

(56) References Cited

U.S. PATENT DOCUMENTS 8,917,662 B2 * 12/2014 Kim ...................... H04W 8/082
                                                                    370/522
2012/0093070 A1 * 4/2012 Huang ................ H04W 84/047
                                                                    370/315
(Continued)

FOREIGN PATENT DOCUMENTS

KR    10-2010-0120259 A    11/2010
WO        2022/216704 A1    10/2022

OTHER PUBLICATIONS

3rd Generation Partnership Project; Technical Specification Group Core Network and Terminals; Access to the 3GPP 5G Core Network (5GCN) via Non-3GPP Access Networks (N3AN); Stage 3 (Release 18), 3GPP TS 24.502 V18.0.0 (Dec. 2022), Jan. 3, 2023.
(Continued)

*Primary Examiner* — Afshawn M Towfighi
(74) *Attorney, Agent, or Firm* — Jefferson IP Law, LLP

(57)        ABSTRACT

The disclosure relates to a 5th generation (5G) communication system or a 6th generation (6G) communication system for supporting higher data rates beyond a 4th generation (4G) communication system such as long term evolution (LTE). A method performed by a user equipment in a wireless communication system is provided. The method includes generating a first non-access stratum (NAS) message including address information of the user equipment, address information of a network function (NF) entity, and name information of a service requested by the user equipment from the NF entity, transmitting the first NAS message to the NF entity via a base station, receiving a second NAS message in response to the first NAS message, from the NF entity via the base station, and the address information of the user equipment wherein the address information of the NF entity are configured by a radio
(Continued)

resource control (RRC) message received from the base station.

20 Claims, 16 Drawing Sheets

(51) Int. Cl.
*H04W 36/00* (2009.01)
*H04W 60/04* (2009.01)

(58) Field of Classification Search
CPC .... H04W 48/08; H04W 72/21; H04L 5/0053; H04L 61/5007
See application file for complete search history.

(56) References Cited

U.S. PATENT DOCUMENTS

| | | | | | |
|---|---|---|---|---|---|
| 2017/0019947 | A1* | 1/2017 | Wu | ........................ | H04W 76/27 |
| 2018/0007591 | A1* | 1/2018 | Xu | .................... | H04W 36/0069 |
| 2019/0166596 | A1 | 5/2019 | Zhu et al. | | |
| 2021/0084121 | A1 | 3/2021 | Park et al. | | |
| 2022/0210859 | A1 | 6/2022 | Guo et al. | | |
| 2022/0303935 | A1 | 9/2022 | Olsson et al. | | |
| 2022/0338153 | A1 | 10/2022 | Tiwari et al. | | |
| 2022/0394088 | A1 | 12/2022 | Salkintzis et al. | | |
| 2024/0281719 | A1* | 8/2024 | Duan | ........................ | G06N 3/08 |
| 2025/0119977 | A1* | 4/2025 | Leiter | ................. | H04L 61/5014 |

OTHER PUBLICATIONS

3rd Generation Partnership Project; Technical Specification Group Services and System Aspects; Procedures for the 5G System (5GS); Stage 2 (Release 18), 3GPP TS 23.502 V18.0.0 (Dec. 2022), Dec. 21, 2022.

International Search Report dated Apr. 5, 2024, issued in International Application No. PCT/KR2023/021698.

DEVOPEDIA, 5G Service-Based Architecture.

* cited by examiner

START

GENERATE FIRST NAS MESSAGE INCLUDING UE ADDRESS INFORMATION, NF ENTITY ADDRESS INFORMATION, AND NAME INFORMATION OF SERVICE REQUESTED BY UE FROM NF ENTITY ~1210

TRANSMIT FIRST NAS MESSAGE TO NF ENTITY VIA BASE STATION ~1220

RECEIVE SECOND NAS MESSAGE FROM NF ENTITY VIA BASE STATION IN RESPONSE TO FIRST NAS MESSAGE ~1230

END

START

RECEIVE FIRST NAS MESSAGE INCLUDING UE
ADDRESS INFORMATION, NF ENTITY ADDRESS
INFORMATION, AND NAME INFORMATION OF
SERVICE REQUESTED BY UE FROM NF ENTITY,
FROM UE VIA BASE STATION
⟨1310

GENERATE SECOND NAS MESSAGE IN RESPONSE
TO FIRST NAS MESSAGE
⟨1320

TRANSMIT SECOND NAS MESSAGE TO
UE VIA BASE STATION
⟨1330

END

METHOD AND APPARATUS FOR TRANSMITTING CONTROL SIGNAL USING SERVICE BASED INTERFACE IN A WIRELESS COMMUNICATION SYSTEM

CROSS-REFERENCE TO RELATED APPLICATION(S)

This application is based on and claims priority under 35 U.S.C. § 119(a) of a Korean patent application number 10-2023-0007150, filed on Jan. 18, 2023, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for transmitting a control signal at a user equipment using a service based interface (SBI) in the wireless communication system.

2. Description of Related Art

Considering the development of wireless communication from generation to generation, various technologies have been developed mainly for services targeting humans, such as voice calls, multimedia services, and data services. Following the commercialization of 5th generation (5G) communication systems, it is expected that the number of connected devices will grow exponentially. Increasingly, these will be connected to communication networks. Examples of connected devices may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in millimeter weave (mm-Wave) bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time, a network technology for utilizing satellites, High-Altitude Platform Stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of Artificial Intelligence (AI) in wireless communication for improvement of overall network operation by utilizing AI from a designing phase for developing 6G and internalizing end-to-end AI support functions, and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting a non-access stratum (NAS) message of a user equipment according to a protocol stack for a NAS connection in a wireless communication system.

In accordance with an aspect of the disclosure, a method performed by a user equipment in a wireless communication system is provided. The method includes generating a first NAS message including address information of the user equipment, address information of a network function (NF)

entity, and name information of a service requested by the user equipment from the NF entity, transmitting the first NAS message to the NF entity via a base station, and receiving a second NAS message in response to the first NAS message, from the NF entity via the base station, wherein the address information of the user equipment and the address information of the NF entity are configured by a radio resource control (RRC) message received from the base station.

In accordance with another aspect of the disclosure, a user equipment in a wireless communication system is provided. The user equipment includes at least one transceiver, and a controller coupled with the at least one transceiver, the controller may be configured to generate a first NAS message including address information of the user equipment, address information of an NF entity, and name information of a service requested by the user equipment from the NF entity, transmit the first NAS message to the NF entity via a base station, and receive a second NAS message in response to the first NAS message, from the NF entity via the base station, wherein the address information of the user equipment and the address information of the NF entity are configured by an RRC message received from the base station.

In accordance with another aspect of the disclosure, a method performed by an NF entity in a wireless communication system is provided. The method includes receiving from a user equipment via base station, a first NAS message including address information of the user equipment, address information of the NF entity, and name information of a service requested by the user equipment from the NF entity, generating a second NAS message in response to the first NAS message, and transmitting the second NAS message to the user equipment via the base station, wherein the address information of the user equipment and the address information of the NF entity is configured by an RRC message received at the user equipment from the base station.

In accordance with another aspect of the disclosure, an NF entity in a wireless communication system is provided. The NF entity includes at least one transceiver, and a controller coupled with the at least one transceiver, the controller may be configured to receive from a user equipment via base station, a first NAS message including address information of the user equipment, address information of the NF entity, and name information of a service requested by the user equipment from the NF entity, generate a second NAS message in response to the first NAS message, and transmit the second NAS message to the user equipment via the base station, wherein the address information of the user equipment and the address information of the NF entity are configured by an RRC message received at the user equipment from the base station.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
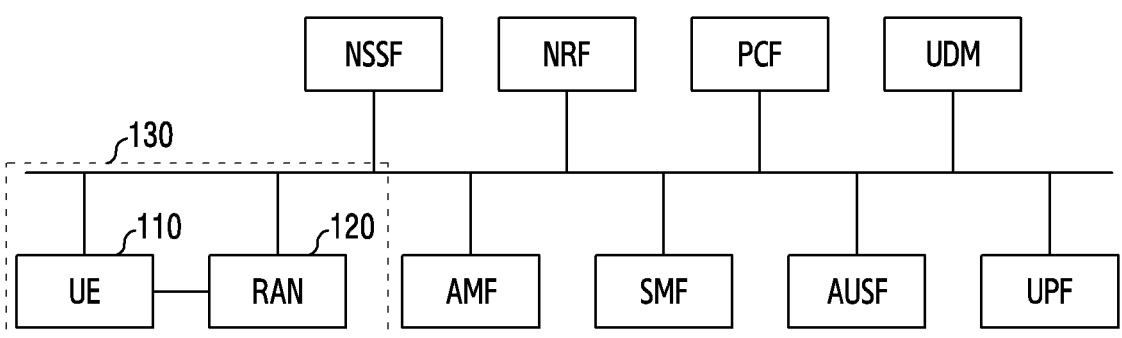
FIG. 1 illustrates a network environment of a service-based architecture (SBI) in a wireless communication system according to an embodiment of the disclosure.

Various aspects of the claimed subject matter are described with reference to the drawings, wherein like reference numerals are used to refer to like elements in the drawings. In the following description, for the purpose of explanation, numerous specific details are set forth to provide a thorough understanding of one or more embodiments. However, it may be evident that such embodiment(s) may be practiced without these specific details.

Terms used in the disclosure are used merely to describe specific embodiments and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the disclosure. Among the terms used in the disclosure, terms defined in a general dictionary may be interpreted as having the same or similar meanings as those in the context of the related art, and unless explicitly defined in the disclosure, may not be interpreted as ideal or excessively formal meanings. In some cases, even terms defined in the disclosure may not be interpreted to exclude embodiments of the disclosure.

It is to be understood that the singular forms "a," "an," and "the" include plural referents unless the context clearly dictates otherwise. Thus, for example, reference to "a component surface" includes reference to one or more of such surfaces.

As used herein, terms indicating signals (e.g., a message, a signal, signaling, a sequence, a stream), terms indicating resources (e.g., a symbol, a slot, a subframe, a radio frame, a subcarrier, a resource element (RE), a resource block (RB), a bandwidth part (BWP), an occasion), terms for operations (e.g., a step, a method, a process, a procedure), terms indicating data (e.g., information, a parameter, a variable, a value, a bit, a symbol, a codeword), terms indicating channels, terms indicating control information (e.g., downlink control information (DCI), medium access control (MAC) codeword element (CE), radio resource control (RRC) signaling), terms indicating network entities, terms indicating components of a device, and the like are illustrated for the purpose of description. Accordingly, the disclosure is not limited to these terms, and other terms having equivalent technical meaning may be used.

Various embodiments of the disclosure are described herein in connection with a wireless terminal and/or a base station. The wireless terminal may refer to a device for providing voice and/or data connectivity to a user. The wireless terminal may be connected to a computing device such as a laptop computer or a desktop computer, or may be a self-contained device such as a personal digital assistant (PDA). The wireless terminal may be referred to as a system, a subscriber unit, a subscriber station, a mobile station, a mobile, a remote station, a remote terminal, an access terminal, a user terminal, a terminal, a wireless communication device, a user agent, a user device, or user equipment. The wireless terminal may be a subscriber station, a wireless device, a cellular phone, a personal communications service (PCS) phone, a cordless telephone, a session initiation protocol (SIP) phone, a wireless local loop (WLL) station, a PDA, a portable device having wireless access capability, or other processing device connected to a wireless modem. The base station (e.g., an access point) may refer to a device in an access network, which communicates with wireless terminals over an air interface through one or more sectors. The base station may include an Internet protocol (IP) network by converting received air-interface frames into IP packets, and act as a router between the wireless terminal and the rest of the access network. The base station may also coordinate management of attributes for the air interface.

Recently, a control plane service-based architecture (SBA) of a fifth generation (5G) core network (CN) has been introduced with cloud and network virtualization. A radio access network (RAN) has a structure in which the control plane of the network uses a service based interface (SBI) and connection with a user equipment (UE) uses a peer-to-peer (P2P) interface. The P2P interface, which uses a dedicated application protocol, needs to update both connected devices if a new service is introduced, and may have complexity of manually configuring all connections if a new device is introduced or relocated.

As utilization of the cloud recently increases, virtualization of the RAN is under active development. In a virtual RAN (vRAN) environment, it is efficient to design the RAN to communicate with other control plane devices within a frame of the SBA such that the CN benefits from the virtualized environment. In addition, it is efficient to design the network structure such that the control plane of the UE may also transmit and receive control signals to and from all control plane devices in the network using the SBI within the SBA frame in the vRAN environment.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Hereinafter, the disclosure describes a method for changing the protocol stack of the UE and the base station to an adequate architecture to configure the control plane of the UE in the SBA frame, and operating the protocol stack in an adequate manner.

FIG. 1 illustrates a network environment of an SBA in a wireless communication system according to an embodiment of the disclosure. FIG. 1 illustrates the SBA network between network functions (NFs) of the CN, a RAN, and a UE.

Referring to FIG. 1, the 5G communication CN architecture is an example of the SBA where the NFs provide one or more services to entities requiring communication services from a particular NF. For example, the NF may also request communication services from other NF. The NFs of the CN are self-contained functions which may be modified and updated in an isolated manner, that is, without affecting other NFs.

Referring to FIG. 1, the CN may include NFs such as a network slicing selection function (NSSF), a network repository function (NRF), a policy control function (PCF), a unified data management (UDM), an access and mobility management function (AMF), a session management function (SMF), an authentication server function (AUSF), and a user plane function (UPF), the NFs of FIG. 1 are merely examples, and the CN may include various other NFs.

In addition to the SBA of the NFs, the CN of FIG. 1 may also include an SBA 130 of a UE 110 and a RAN 120. According to the SBA, the UE, the RAN, and each NF of the CN may transmit and receive requests and responses for functional services of each NE by using the SBI. Also, according to the SBA, the UE may directly indicate its desired NF to the RAN based on the SBI without necessarily passing through the AMF which is the NF managing UE mobility. The RAN 120 may forward the UE service request to the NF required by the UE 110 of the CN.

Figure 2:
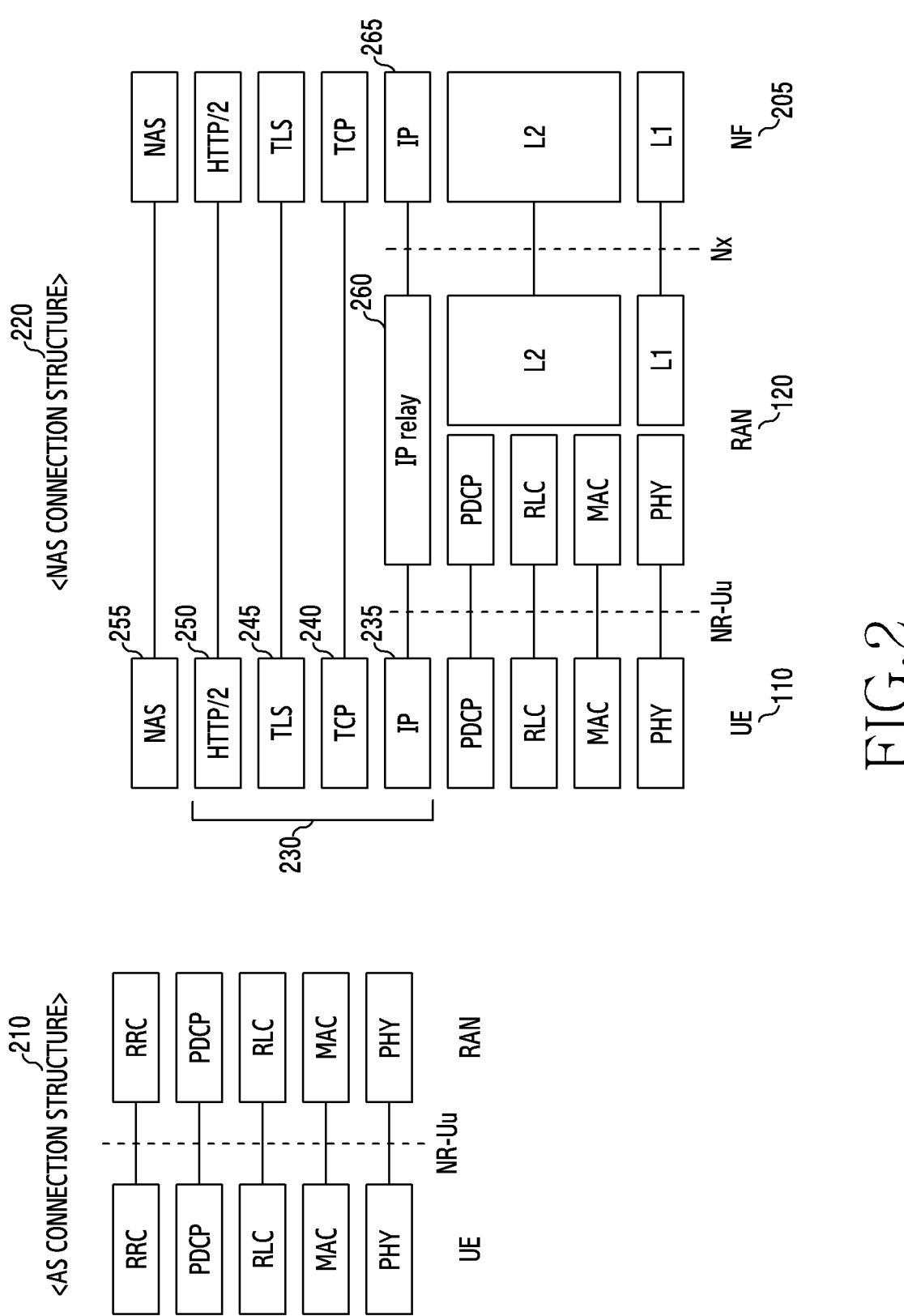
FIG. 2 illustrates an architecture of a protocol stack in a wireless communication system according to an embodiment of the disclosure.

FIG. 2 illustrates an architecture of a protocol stack in a wireless communication system according to an embodiment of the disclosure.

Referring to FIG. 2, the functionality of radio resource control (RRC), packet data convergence protocol (PDCP), radio link control (RLC), medium access control (MAC), and physical (PHY) layers conforms to third generation partnership project (3GPP) standard.

The PHY layer provides an information transfer service using a physical channel. The PHY layer is connected to the MAC layer placed in a higher layer through a transport channel, and data may be transferred between the MAC layer and the PHY layer through the transport channel. In addition, data may be transferred between different physical layers, that is, between physical layers of a transmitting side and a receiving side through a physical channel.

The MAC layer is responsible for mapping various logical channels to various transport channels, and may also perform multiplexing to map multiple logical channels to one transport channel. The MAC layer is connected to the RLC layer which is its upper layer over a logical channel, and the logical channel is divided into a control channel which transmits control plane information and a traffic channel which transmits user plane information, based on the type of the information transmitted.

The RLC layer functions to segment data received from the upper layer and to resize the data such that the lower layer transmits data in a radio section.

The PDCP layer may perform a header compression function for reducing an IP packet header size which is relatively great in size and contains unnecessary control information to efficiently transmit an IP packet such as IP version 4 (Ipv4) or Ipv6 in the radio section of a small bandwidth.

The RRC layer is defined only in the control plane, and may control logical channels, transport channels, and physical channels in relation to configuration, re-configuration, and release of radio bearers.

Referring to FIG. 2, an access stratum (AS) connection structure 210 between a UE and a RAN is depicted.

The AS connection structure 210 indicates a protocol stack for the UE and RAN to transmit and receive AS control information which is control information below the RRC layer. The UE and RAN may transmit and receive messages through the RRC layer.

Referring to FIG. 2, a non-access stratum (NAS) connection structure 220 of the UE, the RAN, and the NF 205 of the CN is illustrated. The NAS connection structure 220 indicates a protocol stack for transmitting and receiving a NAS protocol data unit (PDU), and the NAS connection structure may include a part of the AS protocol stack. The disclosure describes the novel NAS connection structure 220 and the process for transmitting and receiving information between the UE, the RAN, and the NF in the CN based on the NAS connection structure 220.

In the NAS connection structure 220, a NAS layer 255 represents the highest layer of the control plane between the UE and the NF (e.g., the MME or the AMF), and performs functions such as IP session management and mobility management between the UE and the NF. In addition, the NAS connection structure 220 may include one or more of a transmission control protocol (TCP)/IP four layers 230 including a transport protocol layer (e.g., an IP layer 235, a TCP layer 240), a session protocol layer (e.g., a transport layer security (TLS) layer 245), or a web transport protocol layer (e.g., a hypertext transfer protocol version 2 (HTTP/2) layer 250).

Referring to FIG. 2, if transmitting a control message to a specific NF of the CN, the UE may generate a message establishing a TCP/IP connection at the HTTP/2 layer 250 and convert the message into an IP packet to include a NAS message in the message for establishing the TCP/IP connection through the TCP layer 240 and the IP layer 235.

If the UE forwards a NAS message to the CN, the UE may include the NAS message in the message for establishing the TCP/IP connection and forward the message to the RAN 120 via the IP layer 235, without having to forward the NAS message to the RRC layer and forward it to the RAN 120 as an RRC message. The IP layer 235 may assign an address to data of the IP packet containing the corresponding message, and then forward the message to an IP relay layer 260 of the RAN.

The RAN 120 receiving the NAS message from the UE 110 via the IP relay layer 260 may determine which NF the NAS message of the UE 110 is to be forwarded to, by identifying an IP address destination of the IP packet generated by the UE. The RAN 120 may transmit the IP forwarded message to the determined NF 265 without a separate procedure.

In a protocol stack according to the related art where the UE and RAN include the RRC layer, if the RAN receives a NAS PDU of the UE in the form of the RRC message via the RRC layer, the RAN needs to generate and add an RRC header to the RRC message, which may take a considerable time. In addition, the NAS message may not be efficiently transmitted because the RAN needs to forward the RRC message first to the AMF, rather than converting it into a core message and forwarding it directly to the specific NF desired by UE, to transfer the RRC message to the CN.

Hereafter, various embodiments for improving the protocol of the reed art stack described above are provided.

Figure 3:
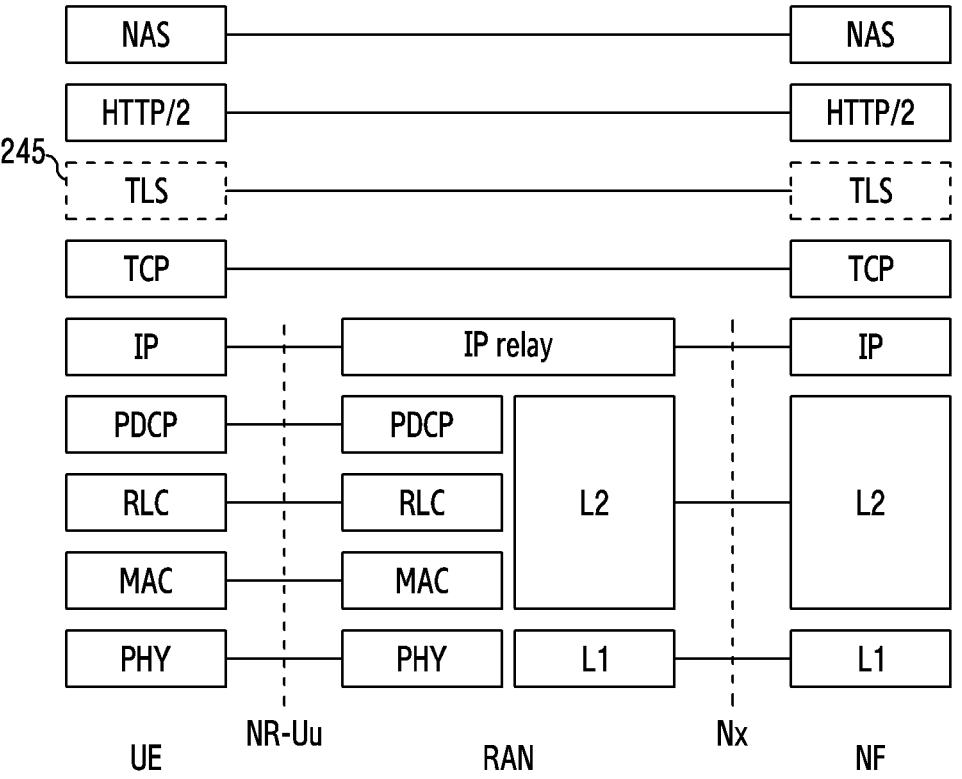
FIG. 3 illustrates an architecture of a protocol stack in a wireless communication system according to an embodiment of the disclosure.

FIG. 3 illustrates a protocol stack architecture in a wireless communication system according to an embodiment of the disclosure. FIG. 3 illustrates a configuration in which the TLS layer 245 is omitted from the protocol stack of FIG. 2.

Referring to FIG. 3, the TLS layer provides communication security, and allows client/server applications to communicate in a reliable manner. It may also ensure end-to-end transport layer security and data integrity in the communication process.

If a connection between the RAN node and the NF obtains high reliability and security thanks to separate network security (e.g., physical security), security of the radio section between the UE and the RAN may be handled by the PDCP layer, and the upper TLS layer 245 may be omitted.

Figure 4:
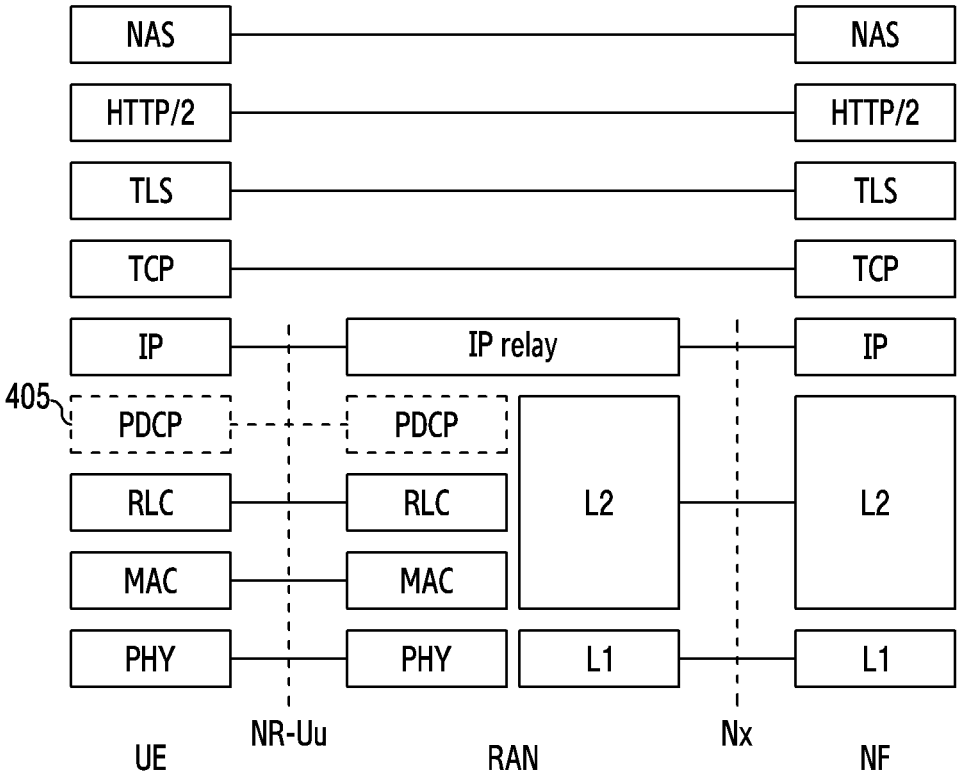
FIG. 4 illustrates an architecture of a protocol stack in a wireless communication system according to an embodiment of the disclosure.

FIG. 4 illustrates a protocol stack architecture in a wireless communication system according to an embodiment of the disclosure. FIG. 4 illustrates a configuration in which the PDCP layer is omitted from the protocol stack of FIG. 2.

Referring to FIG. 4, a PDCP layer 405 may be omitted from the protocol stack, if the protocol stack creates a TLS secure connection with end-to-end between the RAN node and the NF. If the PDCP layer 405 is omitted, no separate ciphering is performed at the PDCP layer 405, thus reducing overhead caused by redundant secure configuration for the radio section between the UE and the RAN.

If the PDCP layer 405 is omitted, the RLC layer provides the IP layer with a connection to each RLC entity over the RLC channel, and the IP layer may determine an appropriate RLC entity based on a source or destination IP and a port to the RAN assigned to the corresponding IP.

Figure 5:
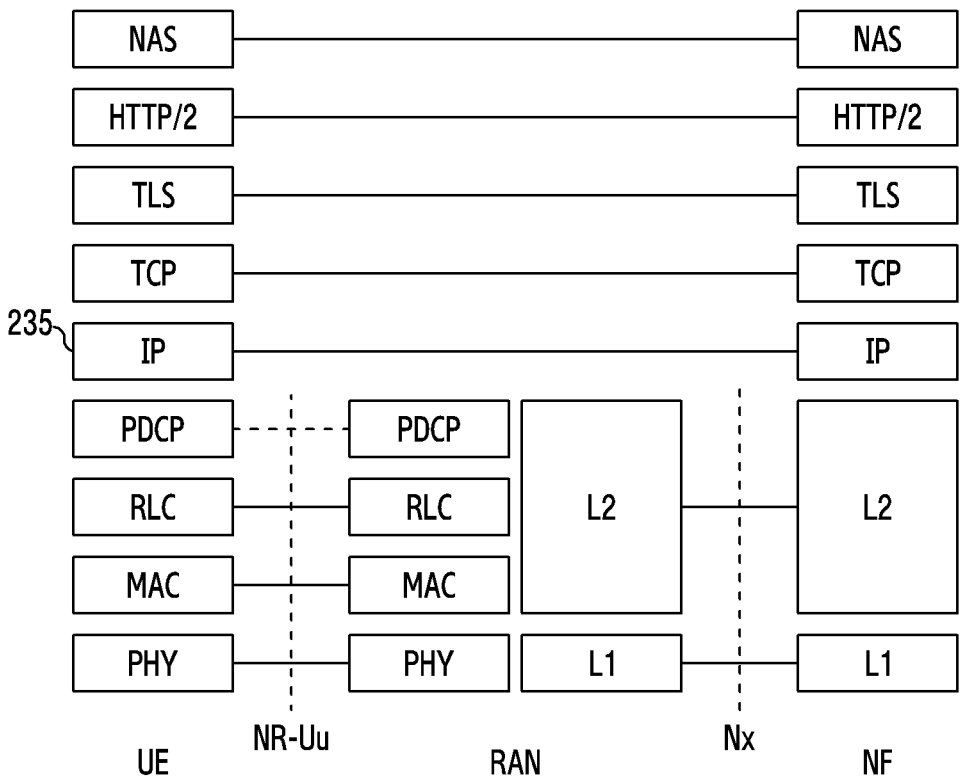
FIG. 5 illustrates an architecture of a protocol stack in a wireless communication system according to an embodiment of the disclosure.

FIG. 5 illustrates a protocol stack architecture in a wireless communication system according to an embodiment of the disclosure. FIG. 5 illustrates a configuration in which the IP relay layer of the RAN is omitted from the protocol stack of FIG. 2.

Referring to FIG. 5, if network connectivity is implemented based on L2 switching, the RAN may receive a NAS message from the UE based on the L2 switching, instead of IP relay, and forward it to a specific NF.

The NF may obtain an address of the RAN to which the UE is currently connected and transmit the message to the L2 layer, and the RAN may forward the message by selecting an adequate SRB or RLC channel based on a UE MAC address contained in the message.

Figure 6:
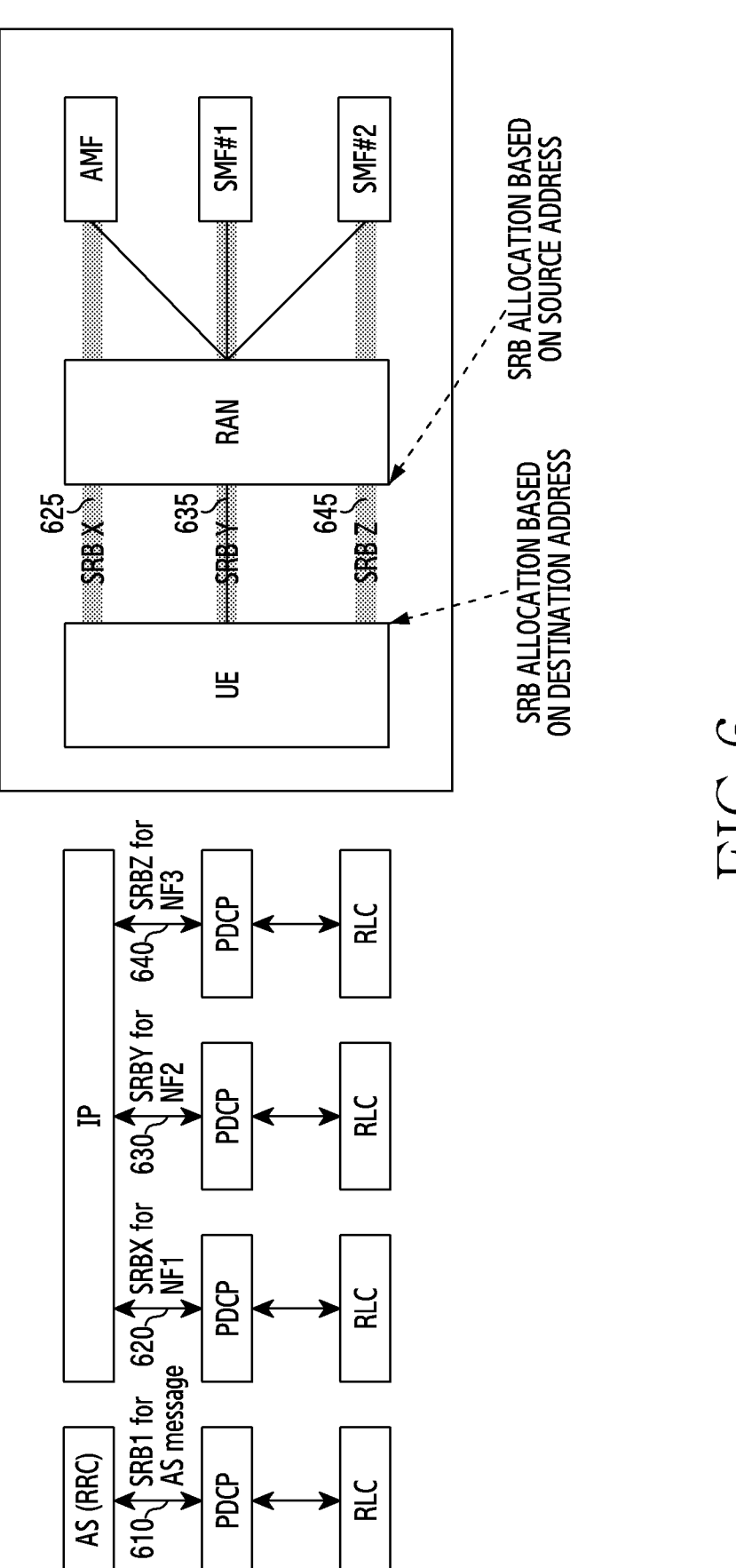
FIG. 6 illustrates operations for assigning a signaling radio bearer (SRB) in a wireless communication system, according to an embodiment of the disclosure.

FIG. 6 illustrates operations for assigning a signaling radio bearer (SRB) in a wireless communication system according to an embodiment of the disclosure.

Referring to FIG. 6, the PDCP layers of the UE and the RAN may provide distinct SRBs to the upper RRC layer and IP layer. In other words, the SRB connecting between the RRC layer and the PDCP layer for data packet delivery of the AS layer and the SRB connecting between the IP layer and the PDCP layer for data packet delivery of the NAS layer may be configured separately and independently.

The UE may assign an additional SRB for the purpose of managing priority of control messages for each NF by using the SRBs provided to the IP layer. The UE may determine the SRB based on a target NF address of an uplink control message, and the RAN may determine the SRB based on a source NF address of a downlink control message.

According to an embodiment of the disclosure, the UE may give a higher priority to a corresponding control message if there is need to transmit the control message fast without retransmission. For example, the UE may give a higher priority than a connection with another NF with respect to the connection with the AMF which manages the connection and the mobility. In addition, the UE allocated PDU sessions of different quality of service (QoS) characteristics from a plurality of SMFs may differentiate session management messages. For example, XR session QoS parameter adjustment may be assigned a high priority, and web session QoS parameter adjustment may be assigned a low priority.

Referring to FIG. 6, the SRB used by the PDCP for the RRC messages to be provided to the RRC may be assigned as an SRB 1 610. By contrast, for a NAS message, NFs having IP address values each may be assigned a separate (or dedicated) SRB for the message transfer of the corresponding NF. For example, if a first NF is an AMF, a second NF is an SMF #1, and a third NF 3 is an SMF #2, the UE or the RAN in FIG. 6 may determine that an SRB X 620 is used for communicating with the AMF via an SRB X path 625, an SRB Y 630 is used for communicating with the SMF #1, and an SRB Z 640 is used for communicating with the SMF #2 via an SRB Z path 645. Hence, the UE, if having a message to transmit to the SMF #1, may transmit the message using the SRB Y 630 and an SRB Y path 635, and the RAN receiving the message via the SRB Y 630 may forward the message of the UE to the SMF #1.

According to an embodiment of the disclosure, the RAN may update relationships of the separate SRBs assigned to the NFs. If an SRB assigned to the NF is added or changed, the RAN may reflect the updating of the SRB and forward the message to the SRB assigned to the NF to which the UE is to forward the message.

Figure 7:
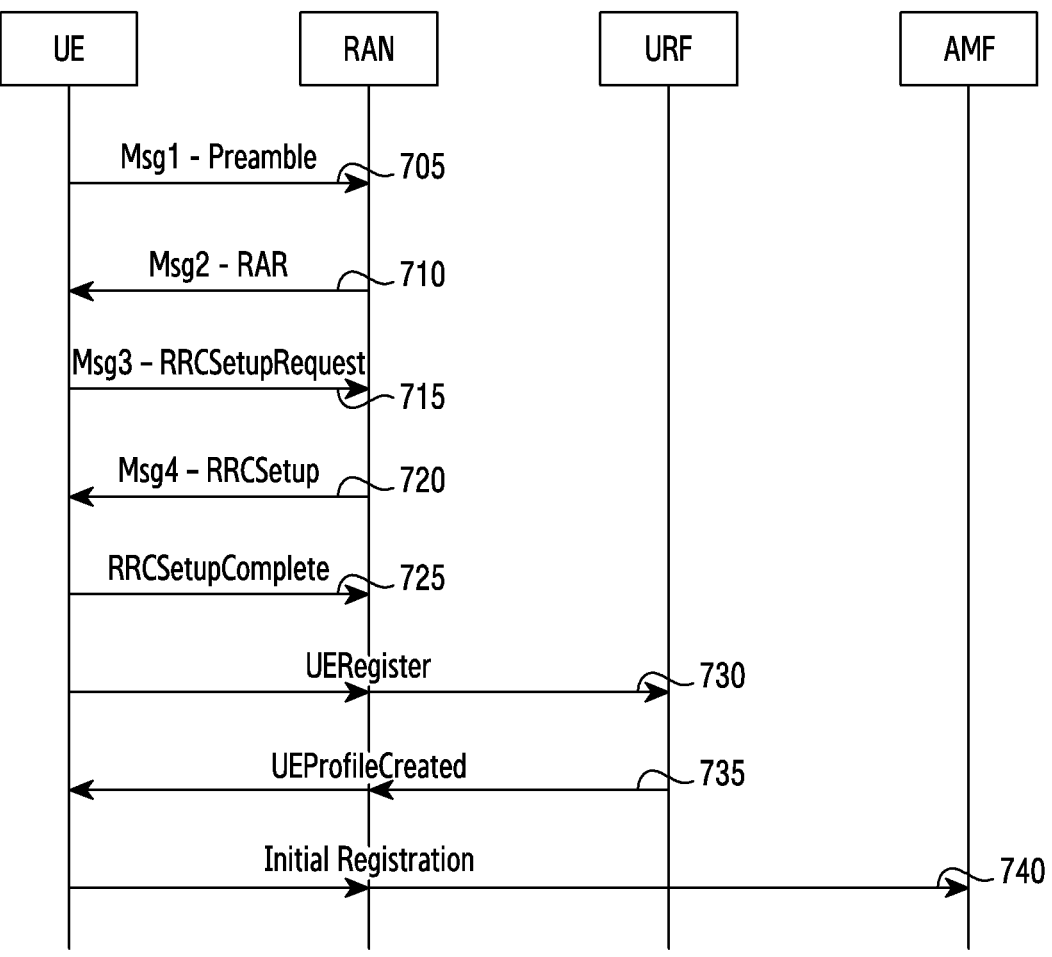
FIG. 7 illustrates a flowchart of operations for registering a user equipment (UE) with a network according to an embodiment of the disclosure.

FIG. 7 illustrates a flowchart of operations for registering a UE with a network according to an embodiment of the disclosure.

Referring to FIG. 7, the UE may obtain the configuration of the protocol stack used by the RAN connected in an initial access process, and an address of a user repository function (URF) or a service communication proxy (SCP) to be accessed for its registration with the network. The URF may be integrated with the NRF in the implementation.

Referring to FIG. 7, in operation 705, the UE may transmit a message (Msg) 1 to the RAN. The Msg 1 message may indicate a random access preamble.

In operation 710, the UE may receive from the RAN a Msg 2 which is a random access response (RAR) message. The Msg 2 may include uplink resource information for the UE to transmit an RRCSetupRequest message to the RAN.

In operation 715, the UE may transmit an RRCSetup message to the RAN based on the uplink resource information obtained from the Msg 2.

In operation 720, the RAN may transmit an RRCSetup message (or Msg 4) to the UE. The RAN may include in the RRCSetup message, UE address information, protocol stack information, and URF (or SCP) address information.

The RRCSetup message may contain the following information.
    masterCellGroup
    radioBearerConfig
    ueAddress
    nasConfig
        Security: TLS or PDCP or both
        Relay: L2 or L3
    initialDiscoveryInfo
        nfType: URF or SCP
        nfAddress
        path: service path
However, the information of the RRCSetup message transmitted by the RAN to the UE is not limited thereto.

In operation 725, the UE may transmit an RRCSetupComplete message, based on the information in the RRCSetup message received from the RAN.

In operation 730, based on the information in the RRCSetup message received from the RAN, the UE may transmit a UERegister message for requesting the registration of the UE, to the URF or the SCP (not shown) via the RAN. Upon receiving the RRCSetup message from the UE, the RAN may forward the RRCSetup message to the URF or the SCP. According to an example of the disclosure, the UERegister message transmission of the UE may be performed concurrently with the RRCSetupComplete message transmission in operation 725.

The UERegister message transmitted by the UE to the URF or the SCP may contain the following information.
    ueAddress (RAN external address)
    ueID (ex. GUTI)
    ueCapability
    selectedPLMN-Identity
    registeredAMF
        plmn-Identity
        amf-Identifier
    s-NSSAI-List
    ranID
However, the information contained in the UERegister message is not limited thereto.

ueAddress is the RAN address externally visible, and may indicate an address indicating which port of the RAN the UE is mapped to.

registeredAMF may indicate information of the AMF previously accessed by the UE.

In operation 735, the URF or the SCP receiving the UERegister message from the UE may register the UE with the network based on the information contained in the UERegister message. The URF or the SCP may register profile information of the UE with the network via the RAN, and then transmit to the UE a UEProfileCreated message notifying the reception of the UERegister message and UE registration complete. Upon receiving the UEProfileCreated message from the URF or the SCP, the RAN may forward the UEProfileCreated message to the UE.

The UEProfileCreated message may contain the following information.
    ueProfile
    PLMN-Identity
    AMFList
        Set of [amfID+amfAddress]
However, the information contained in the UEProfileCreated message is not limited thereto.

ueProfile information may indicate the UE registration information received by the URF or the SCP in the UERegister message.

AMFList may indicate information of accessible AMFs for which the UE may perform the initial registration procedure.

In operation 740, the UE may transmit an InitialRegistration message to the AMF via the RAN, to perform the initial registration procedure to the network.

The InitialRegistration message may contain the following information.

InitialRegistration
        registrationType
        UE ID (ex. GUTI)
        Requested NSSAI
        UE capability However, the information contained in the InitialRegistration message is not limited thereto.

The AMF may receive the InitialRegistration message of the UE via the RAN and then perform the initial registration of the UE. Hence, the AMF responsible for the UE may be determined.

Figure 8:
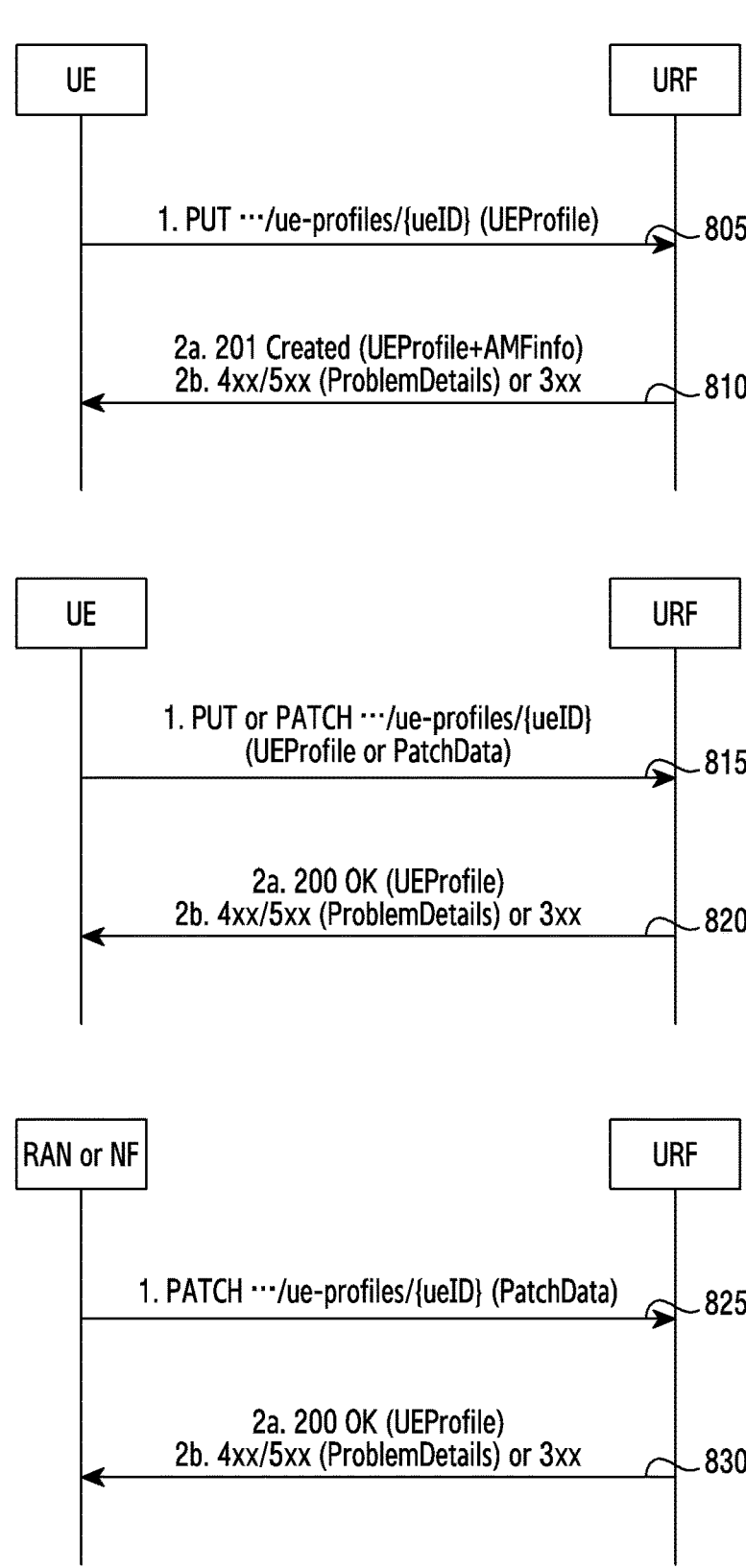
FIG. 8 illustrates a flowchart of operations for managing UE profile information in a network according to an embodiment of the disclosure.

FIG. 8 illustrates a flowchart of operations for managing UE profile information in a network according to an embodiment of the disclosure.

Referring to FIG. 8, for the UE to register with the network, the URF needs to provide a call service to the UE. The URF may manage UE information based on the service. PUT and PATCH described in the following indicate verbs used in the HTTP, and are included in HTTP processors. HTTP PUT may be used to replace the entire state of a resource, and HTTP PATCH may be used to partially modify a resource.

Referring to FIG. 8, in operation 805, the UE may invoke the service for network registration of the UE by transmitting an HTTP PUT message to the URF. The service for the UE network registration of the URF may also be referred to as a UEProfile service.

If the UE invokes the UEProfile service to the URF, then the URF may provide a service allowing the UE to register the profile, in operation 810. The URF may transmit to the UE a response message indicating that the UE is registered. In addition, the URF may transmit the response message additionally including information of the AMF for communicating with the UE.

The UE profile information may include the following information.

UE information
        UE information
        UE ID
        UE capability
        UE NAS version
        UE service list
    connection information
        connected RAN node ID
        RAN IP and port address
        PLMN ID
        AMF ID finally accessed
    service information
        slice list
        PDU session list
        policy level However, the information contained in the profile information is not limited thereto.

UE NAS version may indicate a value representing a service list and an API currently provided by the UE.

The URF may store AMF information, and provide AMF candidate information if the UE initially registers its profile information. However, if the URF does not store the AMF information, the UE may register its profile information with the URF and then perform an AMF discovery procedure again in the NRF.

According to an embodiment of the disclosure, if the UE profile information is changed after the UE profile information is registered with the network, the UE may request to update the profile information registered with the URF.

Referring to FIG. 8, if the UE profile information is changed, then the UE may invoke the address of the registered profile through an HTTP PUT or PATCH message to modify the UE profile information registered with the URF, in operation 815. Thus, the UE may request the URF to update the whole UE profile information, or to partially update the UE profile information through the HTTP PATCH message.

In operation 820, the URF may update the UE profile information registered with the network based on the UE profile information update request message received from the UE, and transmit a response message notifying that the profile information is updated.

According to an embodiment of the disclosure, if the RAN or the NF needs to change the UE profile information registered with the URF, it may request to update the UE profile information registered with the URF.

Referring to FIG. 8, in operation 825, the RAN or the NF may request to partially update the UE profile information through an HTTP PATCH message. Specifically, the RAN or the NF may request the URF to invoke the UE profile address registered with the network and to update some profile information through PATCH.

In operation 830, the URF may update the UE profile information registered with the network based on the UE profile information update request message received from the UE, and transmit a response message notifying that the profile information is updated.

Figure 9:
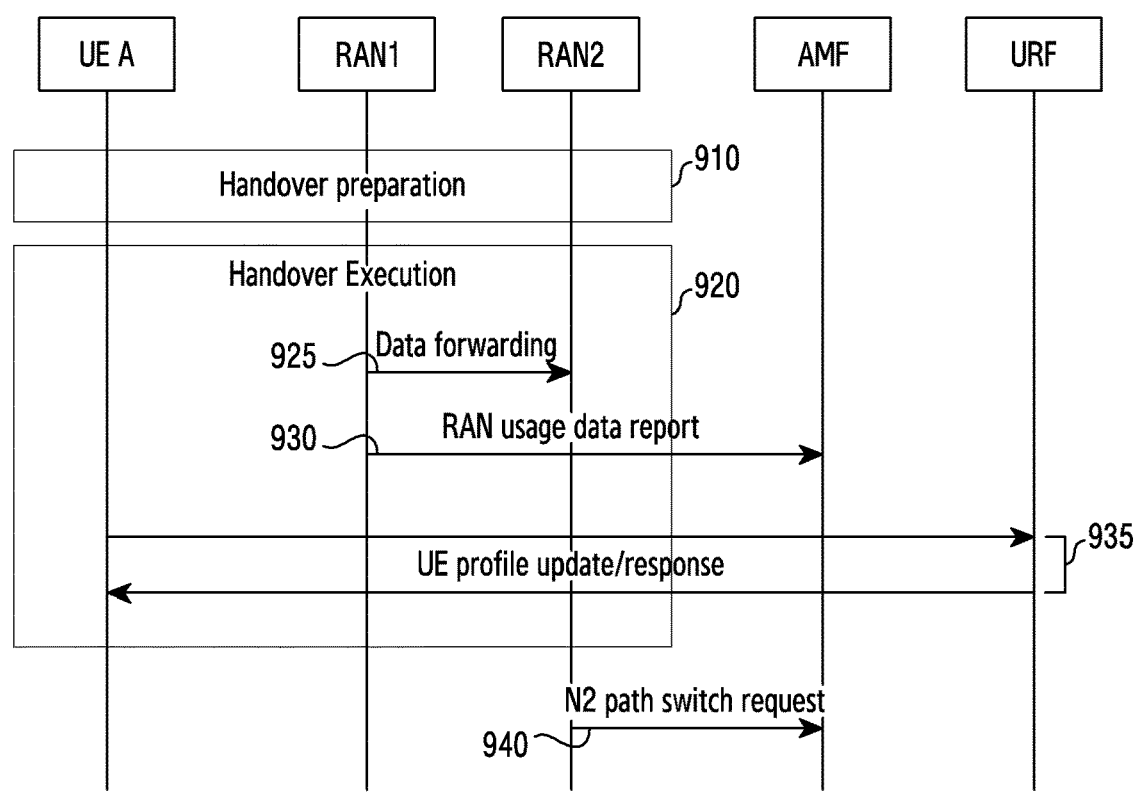
FIG. 9 illustrates a flowchart of operations for changing a UE address according to a UE handover procedure according to an embodiment of the disclosure.
Figure 9:
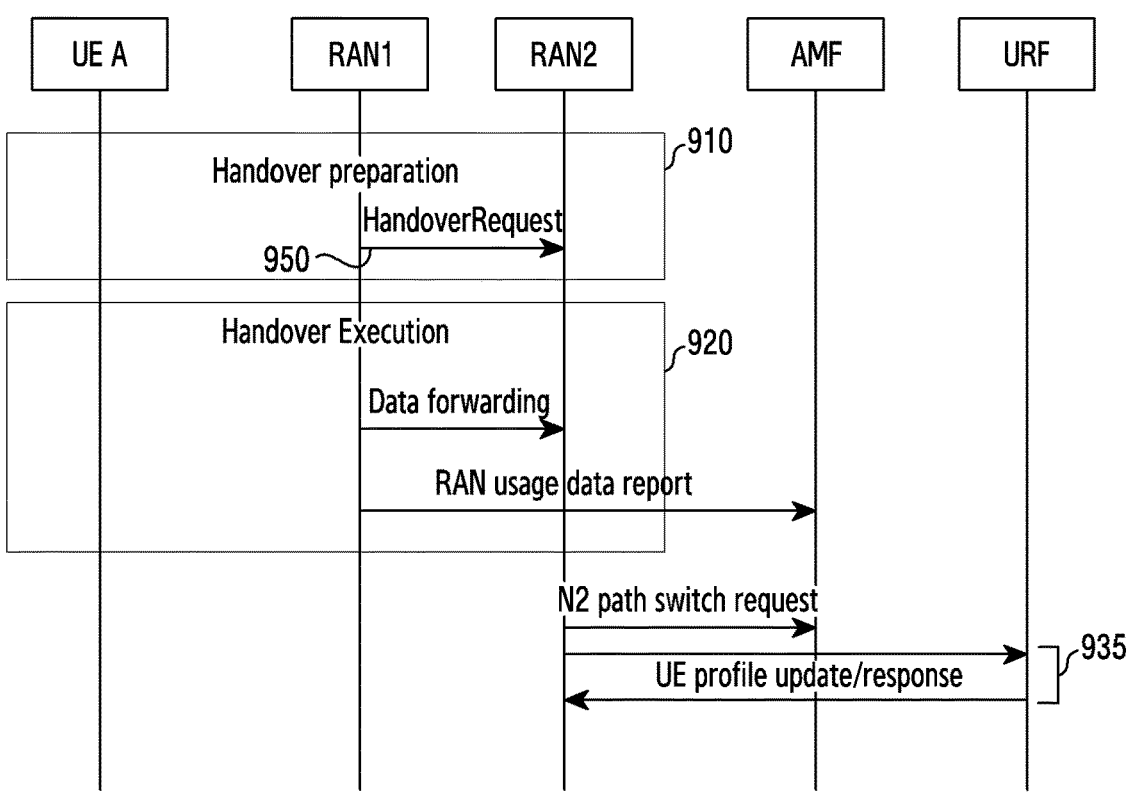

FIG. 9 illustrates a flowchart of operations for changing a UE address according to a UE handover procedure according to an embodiment of the disclosure.

FIG. 9 assumes that a UE A hands over and accordingly the UE address used on the control plane is changed from RAN 1:A to RAN 2:A.

Referring to FIG. 9, if the UE accesses from an existing cell to a new cell and is allocated a new address value in the handover process, it may immediately request UE profile update from the URF.

Referring to FIG. 9, in operation 910, the UE A may perform a handover preparation procedure. For example, the UE A may measure information of the RAN 1 and the RAN 2 and determine based on measurement results, whether the RAN 2 satisfies a handover preparation condition. In addition, if the RAN 1 and the RAN 2 satisfy the handover preparation condition, the UE A may transmit a message requesting the handover preparation to the RAN 2 which is the target cell.

In operation 920, the UE A may perform the handover procedure if the handover preparation procedure is finished in operation 910.

In operation 925, data forwarding from the RAN 1 to the RAN 2 may be performed. The RAN 1 which is the source base station may forward the same data to the RAN 2 which is the target base station. The PDCP layer of the RAN 1 may generate a PDU by assigning a sequence number (SN) to a service data unit (SDU), and transmit the generated PDU to its lower layer (e.g., the MAC layer and/or the PHY layer). The lower layer of the RAN 2 may generate a PDU based on the SDU obtained from the PDCP layer, and forward the generated PDU to the RAN 2.

In operation 930, the RAN 1 may report usage data information to the AMF.

In operation 935, the UE A may request the URF to update the UE profile. The UE may request the URF to change to the UE profile reflecting the new address value assigned from the RAN 2 as the UE hands over from the RAN 1 to the RAN 2.

The UE may invoke the service for the UE profile information to the URF with an HTTP PATCH message. Based on the PATCH message received from the UE, the URF may change the UE A address stored in the existing UE profile information from 'RAN 1:A' to 'RAN 2:A'. Next, the URF may transmit to the UE a response message informing that the UE A address in the UE profile information is changed to 'RAN 2:A'.

In operation 940, the RAN 2 may transmit an N2 path switch request message to the AMF.

According to an embodiment of the disclosure, the RAN may request the URF to update the UE profile during the handover process.

Referring to FIG. 9, in operation 950, the RAN 1 may inform the RAN 2 of which URF is used by the RAN 1 in the handover preparation procedure. To inform the RAN 2 of the URF which manages the UE information, the RAN 1 may transmit a HandoverRequest message containing the URF address to the connectedURF.

In the handover procedure of operation 920, redundant description on the data forwarding from the RAN 1 to the RAN 2 and the RAN usage data report from the RAN 1 to the AMF are omitted.

In operation 935, if transmitting an N2 path switch request message to the AMF, the RAN 2 may request the UE profile information update from the URF. If the UE A hands over from the RAN 1 to the RAN 2 and then the RAN 2 forwards to the AMF the N2 path switch request message containing the new address information, the RAN 2 may request the UE profile update together from the URF.

The RAN 2 may invoke the service for the UE profile information to the URF with an HTTP PATCH message. Based on the PATCH message received from the RAN 2, the URF may change the UE A address stored in the existing UE profile information from 'RAN 1:A' to 'RAN 2:A'. Next, the URF may transmit to the RAN 2 a response message notifying that the UE A address is changed to 'RAN 2:A' in the UE profile information.

Figure 10:
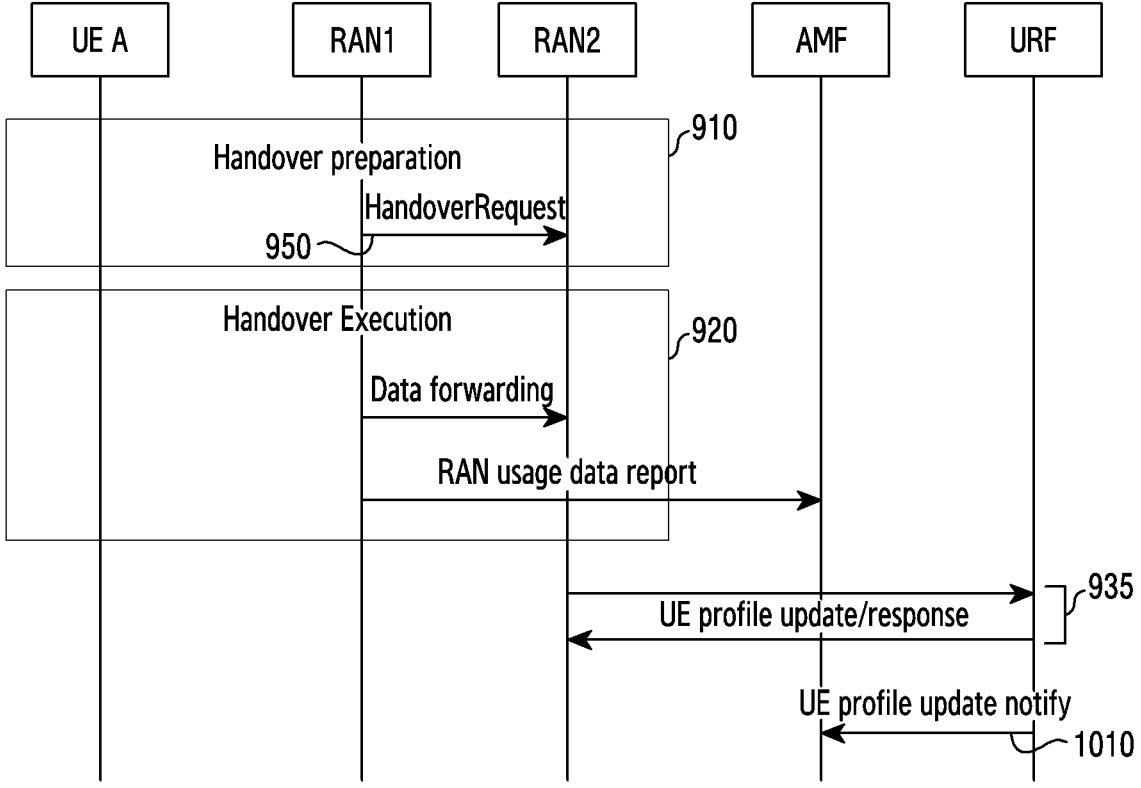
FIG. 10 illustrates a flowchart of operations for changing a UE address according to a UE handover procedure according to an embodiment of the disclosure.

FIG. 10 illustrates a flowchart of operations for changing a UE address according to a UE handover procedure according to an embodiment of the disclosure.

FIG. 10 assumes that a UE A hands over and accordingly the UE address used on the control plane is changed from RAN 1:A to RAN 2:A, and that the AMF already requests subscription for UE A profile from the URF.

Referring to FIG. 10, in operation 950, the RAN 1 may inform the RAN 2 of which URF is used by the RAN 1 in the handover preparation procedure. To inform the RAN 2 of the URF which manages the UE information, the RAN 1 may transmit a HandoverRequest message including the URF address to the connectedURF.

In the handover procedure of operation 920, redundant description on the data forwarding from the RAN 1 to the RAN 2 and the RAN usage data report from the RAN 1 to the AMF are omitted.

In operation 935, if transmitting an N2 path switch request message to the AMF, the RAN 2 may request the URF to update the UE profile information. That is, if the UE A performs the handover from the RAN 1 to RAN 2 and then the RAN 2 forwards to the AMF the N2 path switch request message containing new address information, the RAN 2 may request the UE profile update together from the URF.

The RAN 2 may invoke the service for the UE profile information to the URF with an HTTP PATCH message. Based on the PATCH message received from the RAN 2, the URF may change the UE A address stored in the existing UE profile information from 'RAN 1:A' to 'RAN 2:A'. Next, the URF may transmit to the RAN 2 a response message notifying that the UE A address is changed to 'RAN 2:A' in the UE profile information.

In operation 1010, the URF may transmit to the AMF a message notifying that the UE profile information is updated. Specifically, the URF may transmit to the AMF a UE profile update notify message indicating that the UE A address in the UE profile information is changed to 'RAN 2:A'.

Figure 11:
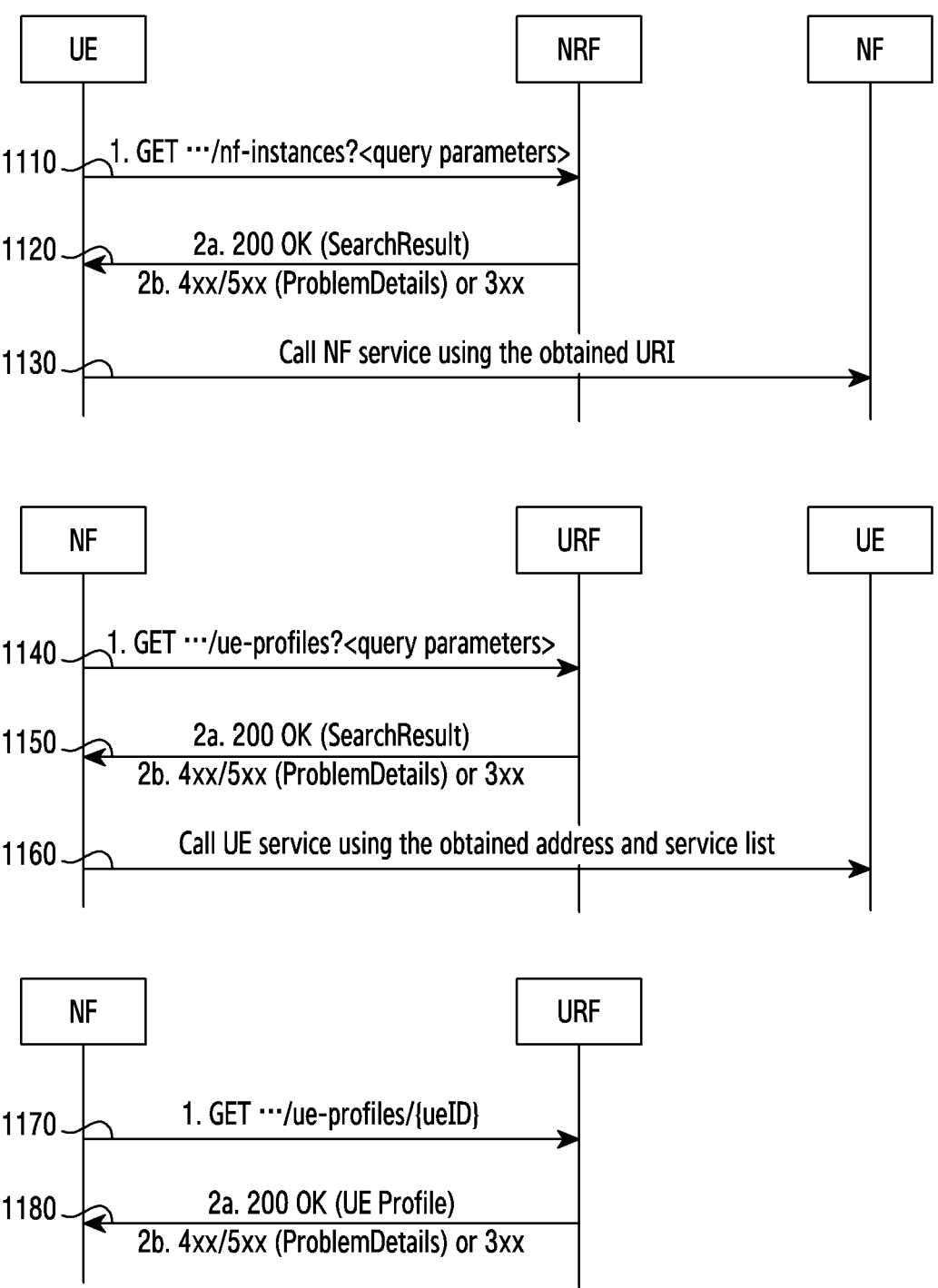
FIG. 11 illustrates a flowchart of operations for a UE to obtain network function (NF) information from a network repository function (NRF) according to an embodiment of the disclosure.

FIG. 11 illustrates a flowchart of operations for a UE to obtain NF information from an NRF according to an embodiment of the disclosure. FIG. 11 illustrates a procedure for a UE to obtain NF information and a procedure for the NF to obtain UE information.

Referring to FIG. 11, the UE may invoke an NF service by receiving an NF discovery service from the NRF, and the UE may obtain NF information by invoking the NF service. The NRF supports a service discovery function, and upon receiving an NF discovery request, provides information of the discovered NF instance to an NF instance.

Referring to FIG. 11, in operation 1110, the UE may transmit to the NRF a query parameter message requesting information of its desired NF instance.

In operation 1120, the NRF may retrieve information such as a uniform resource identifier (URI) of the NF desired by the UE, based on the query parameter message received from the UE. If receiving the NF discovery request from the NF instance, the NRF may provide the NF with information of the discovered NF instances, or transmit a 200 OK response message containing discovery results of information of NF services supported by available NF instances.

In operation 1130, the UE may directly invoke the required service to the NF using the NF information such as the NF URI obtained through the NRF. The UE may directly invoke the service to the NF with a NAS message by using the protocol stack of FIG. 5.

According to an embodiment of the disclosure, the NF may obtain the UE information using the URF.

Referring to FIG. 11, in operation 1140, the NF may transmit to the URF a UE query message including parameters of the desired UE. The UE query message may include the following parameters.

ueAddress ue ID ueCapability

S-NSSAI ranID

However, the parameters included in the UE query message are not limited thereto.

In operation 1150, the URF may retrieve parameters related to the UE based on the UE query message received from the NF, and transmit to the NF a discovery result message including information of the parameters related to the UE. The information included in the discovery result message may include the following information.

ueID ueAddress ueServiceList of ueNAS Version

However, the information included in the discovery result message is not limited thereto.

In operation 1160, the NF may obtain information related to the UE desired by the NF by receiving the discovery result message from the URF in operation 1150. The NF may transmit to the UE a control message for invoking the service by using the obtained UE information (e.g., the UE address and the service list).

According to an embodiment of the disclosure, if the NF requires, after obtaining the UE information from the URF, additional information of the UE, it may request additional information from the URF based on ueID.

In operation 1170, the NF may transmit to the URF a message requesting additional UE profile information based on the ueID information of the UE obtained in operation 1140 and operation 1150.

In operation 1180, based on the message received from the NF in operation 1170, the URF may identify the UE profile information corresponding to ueID and transmit to the NF a response message including the identified UE profile information. Hence, the NF may further obtain the UE information from the URF.

Figure 12:
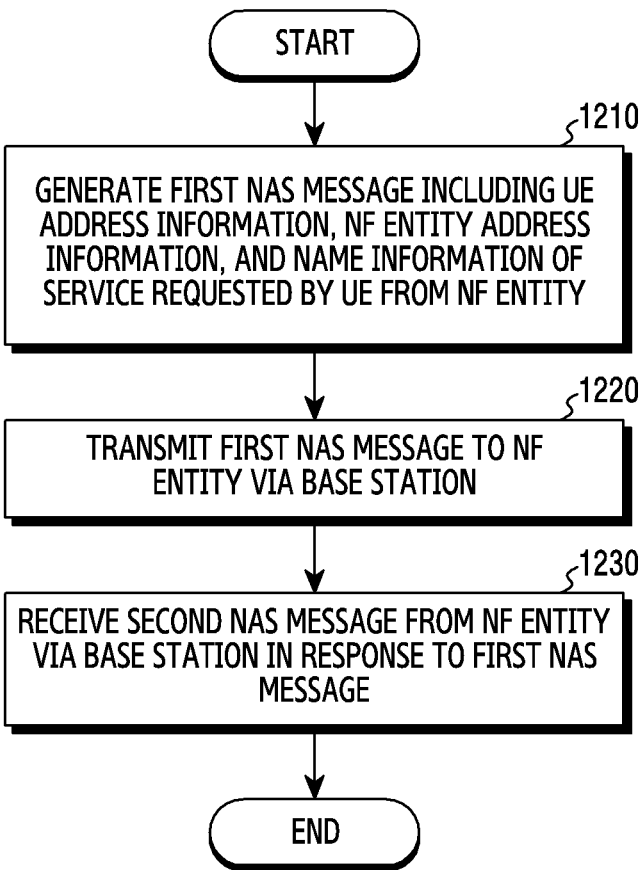
FIG. 12 illustrates operations of a UE according to an embodiment of the disclosure.

FIG. 12 illustrates UE operations according to an embodiment of the disclosure.

Referring to FIG. 12, in operation 1210, the UE may generate a first NAS message including UE address information, NF address information, and name information of a service requested by the UE from the NF. The first NAS message may be a message converted from a NAS message of the UE into the form of an IP packet at the IP layer.

The address information may indicate an identifier for distinguishing a node on the network, such as an IP address, a fully qualified domain name (FQDN), or a MAC address. The source address of the first NAS message may be the UE and the target address may be the NF.

The protocol stack of the UE for generating the first NAS message may be a protocol stack including the NAS layer and the IP processing layer of FIG. 2 through FIG. 5 and not including the RRC layer.

In operation 1220, the UE may transmit the first NAS message to the NF entity via the base station. The UE may transmit the first NAS message generated in the form of the IP packet to the base station via the IP layer (e.g., the IP layer 235 of FIG. 2).

The base station requested by the UE to forward the first NAS message to the NF may change the source IP of the first NAS message to its own address. The base station may change the source IP from the UE to the RAN, and add a port connecting the UE and the base station as a source port. In so doing, the added port may indicate a port for mapping the UE and the base station one-to-one. In the disclosure, if the port corresponding one-to-one is X, the address information of the first NAS message may be changed to source IP: RAN, source port: X, target address: NF.

However, if the UE address is globally unique within the network, the base station may forward the source IP of the first NAS message directly to the NF without changing it.

In operation 1230, the UE may receive a second NAS message from the NF entity via the base station in response to the first NAS message.

If the NF transmits to the base station the second NAS message including the UE address information, the NF address information, and the service name information requested by the UE, the RAN receiving the NF message may change the target address to the UE address and forward it to the UE.

Figure 13:
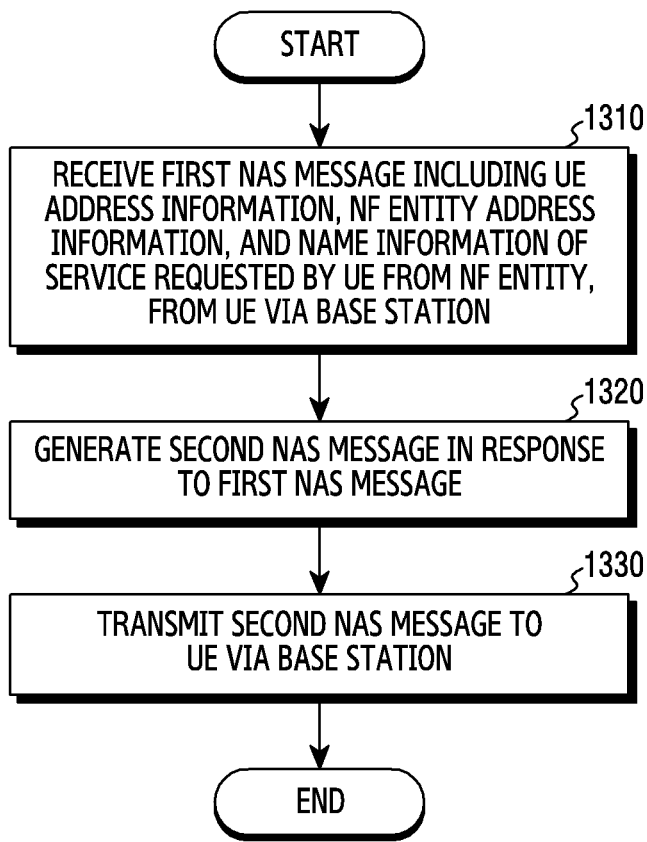
FIG. 13 illustrates operations of an NF according to an embodiment of the disclosure.

FIG. 13 illustrates NF operations according to an embodiment of the disclosure.

Referring to FIG. 13, in operation 1310, the NF may receive via the base station, a first NAS message including UE address information, NF entity address information, and name information of a service requested by the UE from the NF entity. The first NAS message may be a message converted from a NAS message of the UE into the form of the IP packet at the IP layer.

The address information may indicate the identifier for distinguishing a node on the network, such as an IP address, an FQDN, or a MAC address.

The first NAS message of the UE received by the NF entity via the base station may be a message changed by the base station from source address: UE, target address: NF to source IP: RAN, source port: X, target address: NF.

The protocol stack of the NF entity for receiving the first NAS message may include the NAS layer and the IP processing layer.

In operation 1320, the NF entity may generate a second NAS message in response to the first NAS message.

In operation 1330, the NF entity may transmit the second NAS message to the UE via the base station. If the NF transmits to the base station the second NAS message including the UE address information, the NF address information, and the service name information requested by the UE, the RAN receiving the second NAS message may change the target address to the UE address and forward the second NAS message to the UE.

Figure 14:
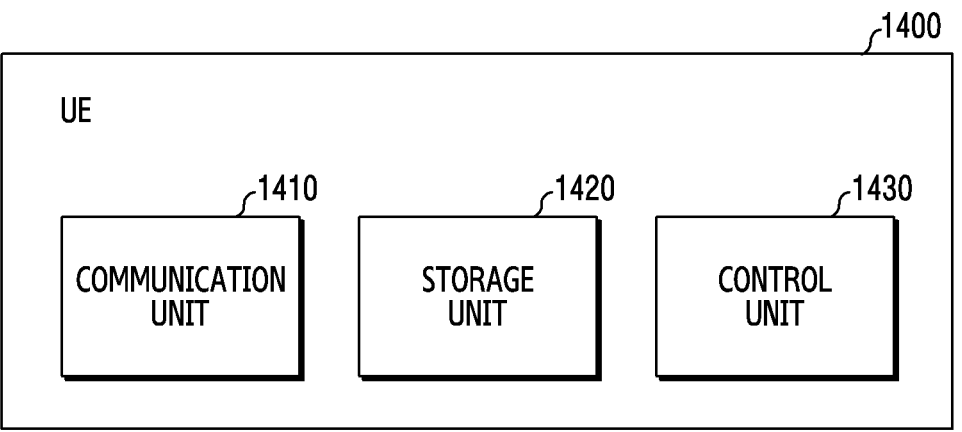
FIG. 14 illustrates a structure of a UE according to an embodiment of the disclosure.

FIG. 14 illustrates a structure of a UE 1400 according to an embodiment of the disclosure.

Referring to FIG. 14, the illustrated configuration may be understood as a configuration of the UE 1400. A term such as ' . . . unit' or ' . . . er' used hereafter indicates a unit for processing at least one function or operation, and may be implemented using hardware, software, or a combination of hardware and software.

Referring to FIG. 14, the UE 1400 includes a communication unit 1410, a storage unit 1420, and a control unit 1430.

The communication unit 1410 performs functions for transmitting and receiving a signal over a radio channel. For example, the communication unit 1410 performs a conversion function between a baseband signal and a bit string according to the physical layer standard of the system. For example, in data transmission, the communication unit 1410 generates complex symbols by encoding and modulating a transmit bit string. Also, in data reception, the communication unit 1410 restores a receive bit string by demodulating and decoding a baseband signal. Also, the communication unit 1410 up-converts the baseband signal into a radio frequency (RF) band signal, transmits it over an antenna, and down-converts an RF band signal received via the antenna into a baseband signal. For example, the communication unit 1410 may include a transmit filter, a receive filter, an amplifier, a mixer, an oscillator, a digital to analog convertor (DAC), an analog to digital convertor (ADC), and the like.

The communication unit 1410 may include a plurality of transmit and receive paths. Further, the communication unit 1410 may include an antenna unit. The communication unit 1410 may include at least one antenna array including a plurality of antenna elements. In view of the hardware, the communication unit 1410 may include a digital circuit and an analog circuit (e.g., an RF integrated circuit (RFIC)). Herein, the digital circuit and the analog circuit may be implemented as a single package. Also, the communication unit 1410 may include a plurality of RF chains. The communication unit 1410 may perform beamforming. The communication unit 1410 may apply a beamforming weight to a signal, to give directivity to the signal to transmit or receive according to the configuration of the control unit 1430. According to an embodiment, the communication unit 1410 may include an RF block (or an RF unit). The RF block may include first RF circuitry related to the antenna and second RF circuitry related to baseband processing. The first RF circuitry may be referred to as an RF-antenna (A). The second RF circuitry may be referred to as an RF-baseband (B).

The communication unit 1410 may transmit or receive a signal. For doing so, the communication unit 1410 may include at least one transceiver. The communication unit 1410 may receive a downlink signal. The downlink signal may include a synchronization signal (SS), a reference signal (RS) (e.g., a demodulation (DM)-RS, a phase tracking reference signal (PTRS)), system information (e.g., a master information block (MIB), a system information block (SIB), remaining system information (RMSI), other system information (OSI)), a configuration message, control information or downlink data, or the like. Also, the communication unit 1410 may transmit an uplink signal. The uplink signal may include a random access related signal (e.g., a random access preamble (RAP) (or Msg1 or Msg3), a reference signal (e.g., a sounding reference signal (SRS), a DMRS, a PTRS), a power headroom report (PHR), or the like.

The communication unit 1410 may include different communication modules to process signals of different frequency bands. Further, the communication unit 1410 may include a plurality of communication modules to support a plurality of radio access technologies. For example, the different radio access technologies may include Bluetooth low energy (BLE), wireless fidelity (Wi-Fi), Wi-Fi Gigabyte (WiGig), a cellular network (e.g., long term evolution (LTE), new radio ((NR)) and so on. In addition, the different frequency bands may include a super high frequency (SHF) (e.g., 2.5 GHz, 5 GHz) band, and a millimeter wave (mm-Wave) (e.g., 30 GHz, 60 GHz) band. Also, the communication unit 1410 may use the radio access technology of the same type on an unlicensed band for different frequency bands (e.g., a licensed assisted access (LAA)) and citizens broadband radio service (CBRS) (e.g., 3.5 GHz)).

The communication unit 1410 transmits and receives the signals as stated above. Hence, whole or a part of the communication unit 1410 may be referred to as 'a transmitter', 'a receiver', or 'a transceiver'. In addition, the transmission and the reception over the radio channel are used as the meaning which embraces the above-stated processing of the communication unit 1410 in the following explanation.

The storage unit 1420 stores a basic program for operating the UE 1400, an application program, and data such as setting information. The storage unit 1420 may include a volatile memory, a non-volatile memory, or a combination of a volatile memory and a non-volatile memory. The storage unit 1420 provides the stored data at a request of the control unit 1430.

The control unit 1430 controls general operations of the UE 1400. For example, the control unit 1430 transmits and receives the signal through the communication unit 1410. Also, the control unit 1430 records and reads data in and from the storage unit 1420. The control unit 1430 may execute the functions of the protocol stack required by the communication standard. For doing so, the control unit 1430 may include at least one processor. The control unit 1430 may include at least one processor or a microprocessor, or may be part of a processor. In addition, a part of the communication unit 1410 and the control unit 1430 may be referred to as a cellular processor (CP). The control unit 1430 may include various modules for performing the communication. According to various embodiments, the control unit 1430 may control the UE to perform operations according to various embodiments.

Figure 15:
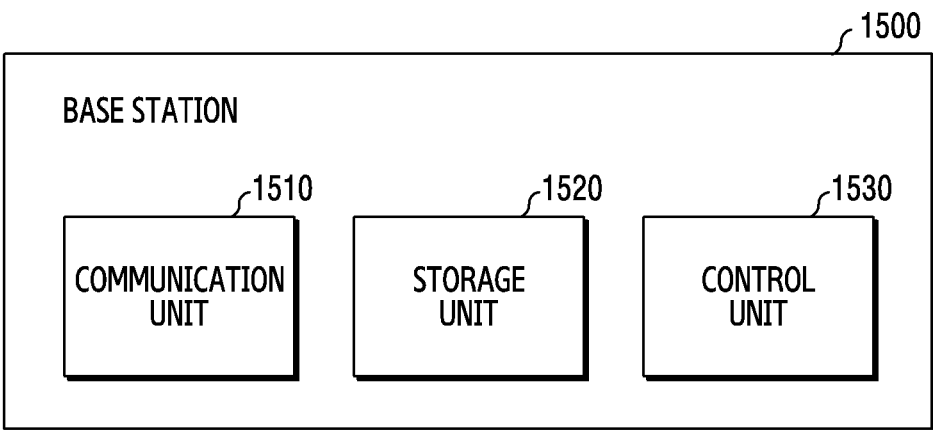
FIG. 15 illustrates a structure of a base station according to an embodiment of the disclosure.

FIG. 15 illustrates a structure of a base station 1500 according to an embodiment of the disclosure.

Referring to FIG. 15, the base station 1500 includes a communication unit 1510, a storage unit 1520, and a control unit 1530.

The communication unit 1510 performs functions for transmitting and receiving a signal over a radio channel. For example, the communication unit 1510 performs a conversion function between a baseband signal and a bit string according to the physical layer standard of the system. For example, in data transmission, the communication unit 1510 generates complex symbols by encoding and modulating a transmit bit string. Also, in data reception, the communication unit 1510 restores a receive bit string by demodulating and decoding a baseband signal. Also, the communication unit 1510 up-converts the baseband signal into an RF band signal, transmits it over an antenna, and down-converts an RF band signal received via an antenna into a baseband signal.

For doing so, the communication unit 1510 may include a transmit filter, a receive filter, an amplifier, a mixer, an oscillator, a DAC, an ADC, and so on. In addition, the communication unit 1510 may include a plurality of transmit and receive paths. Further, the communication unit 1510 may include at least one antenna array including a plurality of antenna elements. In view of the hardware, the communication unit 1510 may include a digital unit and an analog unit, and the analog unit may include a plurality of sub-units according to an operating power, an operating frequency and the like.

The communication unit 1510 may transmit and receive a signal. For doing so, the communication unit 1510 may include at least one transceiver. For example, the communication unit 1510 may transmit a synchronization signal, a reference signal, system information, a message, control information, or data. The communication unit 1510 may perform the beamforming.

The communication unit 1510 transmits and receives the signal as stated above. Hence, whole or a part of the communication unit 1510 may be referred to as 'a transmitter', 'a receiver', or 'a transceiver'. Also, in the following explanation, the transmission and the reception over the radio channel are used as the meaning which embraces the above-stated processing of the communication unit 1510.

The storage unit 1520 stores a basic program for operating the base station 1500, an application program, and data such as setting information. The storage unit 1520 may include a memory. The storage unit 1520 may include a volatile memory, a non-volatile memory, or a combination of a volatile memory and a non-volatile memory. The storage unit 1520 provides the stored data at a request of the control unit 1530.

The control unit 1530 controls general operations of the base station 1500. For example, the control unit 1530 transmits and receives the signal through the communication unit 1510. Also, the control unit 1530 records and reads data in and from the storage unit 1520. The control unit 1530 may execute the functions of the protocol stack requested by the communication standard. For doing so, the control unit 1530 may include at least one processor.

The configuration of the base station 1500 shown in FIG. 15 is merely the example of the base station, and the example of the base station for carrying out various embodiments of the disclosure is not limited from the configuration shown in FIG. 15. That is, some configuration may be added, deleted, or changed, according to various embodiments.

FIG. 15 has described the base station as the single entity, but the disclosure is not limited thereto. The base station 1500 according to an embodiment of the disclosure may be implemented to build an access network having distributed deployment as well as integrated deployment. According to an embodiment, the base station may be divided into a central unit (CU) and a digital unit (DU), the CU may be implemented to perform upper layers (e.g., the PDCP, the RRC) and the DU may be implemented to perform lower layers (e.g., the MAC, the PHY).

Figure 16:
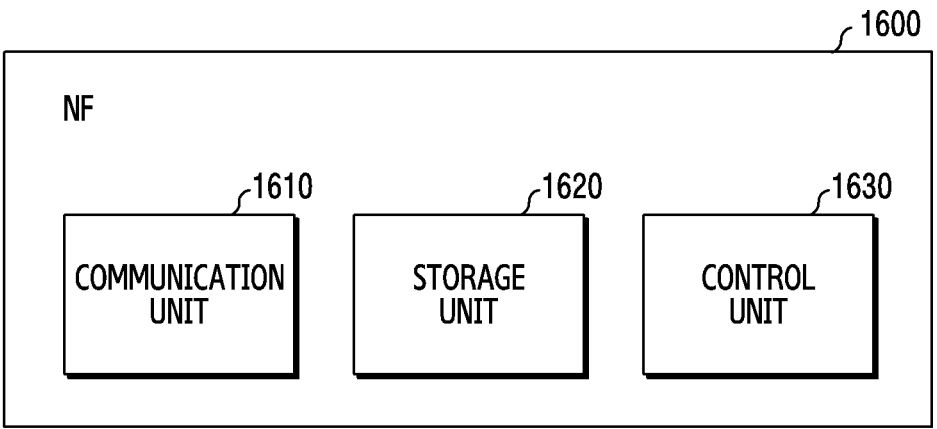
FIG. 16 illustrates a structure of an NF according to an embodiment of the disclosure.

FIG. 16 illustrates an NF structure according to an embodiment of the disclosure.

Referring to FIG. 16, an NF 1600 includes a communication unit 1610, a storage unit 1620, and a control unit 1630.

The communication unit 1610 may transmit and receive messages or data for transmitting and receiving configurations to and from other network entities or other systems.

The storage unit 1620 may store at least one of information transmitted or received through the communication unit 1610 and information generated through the control unit 1630.

The storage unit 1620 may be connected to the communication unit 1610 and the control unit 1630, to store every information, data, and message required to transmit and receive the configurations in the embodiment of the disclosure.

The control unit 1630 may be defined as a circuit or an application specific integrated circuit or at least one processor.

The control unit 1630 may control general operations of the NF according to the embodiment described above. For example, the control unit 1630 may control the signal flow between the blocks to carry out the operations according to the aforementioned drawings and flowcharts.

Meanwhile, the embodiments of the disclosure described herein and in the drawings are given as specific examples only to illustrate the technical content of the disclosure and to facilitate the understanding of the disclosure, and are not intended to limit the scope of the disclosure. That is, it will be apparent to one of ordinary skill in the art to which the disclosure belongs that other modifications based on the technical ideas of the disclosure may be practiced. Further, each of the above embodiments may be operated in combination with each other as required.

According to an embodiment of the disclosure, a method performed by a user equipment in a wireless communication system, may include generating a first NAS message including address information of the user equipment, address information of an NF entity, and name information of a service requested by the user equipment from the NF entity, transmitting the first NAS message to the NF entity via a base station, receiving a second NAS message in response to the first NAS message, from the NF entity via the base station, and the address information of the user equipment and the address information of the NF entity may be configured by an RRC message received from the base station.

According to various embodiments disclosed herein, a protocol stack of the user equipment for generating the first NAS message may include a NAS layer and an IP processing layer, and may not include an RRC layer.

According to various embodiments disclosed herein, the method may further include transmitting a UERegister message including registration request information of the user equipment, to a URF entity via the base station, and receiving a UEProfileCreated message based on the UERegister message, from the URF entity via the base station.

According to various embodiments disclosed herein, the method may further include transmitting an InitialRegistration message including initial registration information of the user equipment, to an AMF entity via the base station.

According to various embodiments disclosed herein, the address information of the user equipment may include IP allocation information of the UE mapped to a connection port of the base station one-to-one.

According to an embodiment of the disclosure, a user equipment in a wireless communication system, may include at least one transceiver, and a controller coupled with the at least one transceiver. The controller may be configured to generate a first NAS message including address information of the user equipment, address information of an NF entity, and name information of a service requested by the user equipment from the NF entity, transmit the first NAS message to the NF entity via a base station, and receive a second NAS message in response to the first NAS message, from the NF entity via the base station, and the address information of the user equipment and the address information of the NF entity may be configured by an RRC message received from the base station.

According to various embodiments disclosed herein, a protocol stack of the user equipment for generating the first NAS message may include a NAS layer and an IP processing layer, and may not include an RRC layer.

According to various embodiments disclosed herein, the controller may be configured to transmit a UERegister message including registration request information of the user equipment, to a URF entity via the base station, and receive a UEProfileCreated message based on the UERegister message, from the URF entity via the base station.

According to various embodiments disclosed herein, the controller may be configured to transmit an InitialRegistration message including initial registration information of the user equipment, to an AMF entity via the base station.

According to various embodiments disclosed herein, the address information of the user equipment may include IP allocation information of the user equipment mapped to a connection port of the base station one-to-one.

According to an embodiment of the disclosure, a method performed by an NF entity in a wireless communication system, may include receiving from a user equipment via base station, a first NAS message including address information of the user equipment, address information of the NF entity, and name information of a service requested by the user equipment from the NF entity, generating a second NAS message in response to the first NAS message, and transmitting the second NAS message to the user equipment via the base station, and the address information of the user equipment and the address information of the NF entity may be configured by an RRC message received at the user equipment from the base station.

According to various embodiments disclosed herein, a protocol stack of the NF entity for receiving the first NAS message may include a NAS layer and an internet protocol (IP) processing layer.

According to various embodiments disclosed herein, the method may further include receiving a UERegister message including registration request information of the user equipment, from the user equipment via the base station, and transmitting a UEProfileCreated message based on the UERegister message, to the user equipment via the base station.

According to various embodiments disclosed herein, the method may further include, if profile information of the user equipment is updated, receiving from the user equipment, a message requesting to update the profile information of the user equipment through PUT or PATCH, and transmitting an update request acknowledgment (ACK) message including the updated profile information of the user equipment in response to the message requesting the update.

According to various embodiments disclosed herein, the address information of the user equipment may include IP allocation information of the user equipment mapped to a connection port of the base station one-to-one.

According to an embodiment of the disclosure, an NF entity in a wireless communication system according to various embodiments disclosed herein may include at least one transceiver, and a controller coupled with the at least one transceiver. The controller may be configured to, receive from a user equipment via base station, a first NAS message including address information of the user equipment, address information of the NF entity, and name information of a service requested by the UE from the NF entity, generate a second NAS message in response to the first NAS message, and transmit the second NAS message to the user equipment via the base station, and the address information of the user equipment and the address information of the NF entity may be configured by an RRC message received at the user equipment from the base station.

According to various embodiments disclosed herein, a protocol stack of the NF entity for receiving the first NAS message may include a NAS layer and an IP processing layer.

According to various embodiments disclosed herein, the controller may be configured to receive a UERegister message including registration request information of the user equipment, from the user equipment via the base station, and transmit a UEProfileCreated message based on the UERegister message, to the user equipment via the base station.

According to various embodiments disclosed herein, the controller may be configured to, if profile information of the user equipment is updated, receive from the user equipment, a message requesting to update the profile information of the user equipment through PUT or PATCH, and transmit an update request ACK message including the updated profile information of the user equipment in response to the message requesting the update.

According to various embodiments disclosed herein, the address information of the user equipment may include IP allocation information of the user equipment mapped to a connection port of the base station one-to-one.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment in a wireless communication system, the method comprising:
    generating a first non-access stratum (NAS) message including address information of the user equipment, address information of a network function (NF) entity, and name information of a service requested by the user equipment from the NF entity;

transmitting the first NAS message to the NF entity via a base station; and
    receiving a second NAS message in response to the first NAS message, from the NF entity via the base station,
    wherein the address information of the user equipment and the address information of the NF entity are configured by a radio resource control (RRC) message received from the base station.

2. The method of claim 1,
    wherein a protocol stack of the user equipment for generating the first NAS message includes a NAS layer and an internet protocol (IP) processing layer, and
    wherein the protocol stack of the user equipment for generating the first NAS message comprises no RRC layer.

3. The method of claim 1, further comprising:
    transmitting a UERegister message including registration request information of the user equipment, to a user repository function (URF) entity via the base station; and
    receiving a UEProfileCreated message based on the UERegister message, from the URF entity via the base station.

4. The method of claim 3, further comprising:
    transmitting an InitialRegistration message including initial registration information of the user equipment, to an access management function (AMF) entity via the base station.

5. The method of claim 1, wherein the address information of the user equipment includes IP allocation information of the user equipment mapped to a connection port of the base station one-to-one.

6. A user equipment in a wireless communication system, the user equipment comprising:
    at least one transceiver; and
    a controller coupled with the at least one transceiver,
    wherein the controller is configured to:
        generate a first non-access stratum (NAS) message including address information of the user equipment, address information of a network function (NF) entity, and name information of a service requested by the user equipment from the NF entity,
        transmit the first NAS message to the NF entity via a base station, and
        receive a second NAS message in response to the first NAS message, from the NF entity via the base station,
    wherein the address information of the user equipment and the address information of the NF entity are configured by a radio resource control (RRC) message received from the base station.

7. The user equipment of claim 6,
    wherein a protocol stack of the user equipment for generating the first NAS message comprises a NAS layer and an internet protocol (IP) processing layer, and
    wherein the protocol stack of the user equipment for generating the first NAS message comprises no RRC layer.

8. The user equipment of claim 6, wherein the controller is configured to:
    transmit a UERegister message including registration request information of the user equipment, to a user repository function (URF) entity via the base station; and
    receive a UEProfileCreated message based on the UERegister message, from the URF entity via the base station.

9. The user equipment of claim 8, wherein the controller is configured to:

transmit an InitialRegistration message including initial registration information of the user equipment, to an access management function (AMF) entity via the base station.

10. The user equipment of claim 6, wherein the address information of the user equipment includes IP allocation information of the user equipment mapped to a connection port of the base station one-to-one.

11. A method performed by a network function (NF) entity in a wireless communication system, the method comprising:

receiving from a user equipment via base station, a first non-access stratum (NAS) message including address information of the user equipment, address information of the NF entity, and name information of a service requested by the user equipment from the NF entity;

generating a second NAS message in response to the first NAS message; and transmitting the second NAS message to the user equipment via the base station, wherein the address information of the user equipment and the address information of the NF entity are configured by a radio resource control (RRC) message received at the user equipment from the base station.

12. The method of claim 11, wherein a protocol stack of the NF entity for receiving the first NAS message includes a NAS layer and an internet protocol (IP) processing layer.

13. The method of claim 11, further comprising:

receiving a UERegister message including registration request information of the user equipment, from the user equipment via the base station; and transmitting a UEProfileCreated message based on the UERegister message, to the user equipment via the base station.

14. The method of claim 13, further comprising:

if profile information of the user equipment is updated, receiving from the user equipment, a message requesting to update the profile information of the user equipment through PUT or PATCH; and transmitting an update request acknowledgment (ACK) message including the updated profile information of the user equipment in response to the message requesting the update.

15. The method of claim 11, wherein the address information of the user equipment includes IP allocation information of the user equipment mapped to a connection port of the base station one-to-one.

16. A network function (NF) entity in a wireless communication system, the NF entity comprising:

at least one transceiver; and a controller coupled with the at least one transceiver, wherein the controller is configured to:

receive from a user equipment via base station, a first non-access stratum (NAS) message including address information of the user equipment, address information of the NF entity, and name information of a service requested by the user equipment from the NF entity, generate a second NAS message in response to the first NAS message, and transmit the second NAS message to the user equipment via the base station, wherein the address information of the user equipment and the address information of the NF entity are configured by a radio resource control (RRC) message received at the user equipment from the base station.

17. The NF entity of claim 16, wherein a protocol stack of the NF entity for receiving the first NAS message comprises a NAS layer and an internet protocol (IP) processing layer.

18. The NF entity of claim 16, wherein the controller is configured to:

receive a UERegister message including registration request information of the user equipment, from the user equipment via the base station; and transmit a UEProfileCreated message based on the UERegister message, to the user equipment via the base station.

19. The NF entity of claim 18, wherein the controller is configured to:

if profile information of the user equipment is updated, receive from the user equipment, a message requesting to update the profile information of the user equipment through PUT or PATCH; and transmit an update request acknowledgment (ACK) message including the updated profile information of the user equipment in response to the message requesting the update.

20. The NF entity of claim 16, wherein the address information of the user equipment includes IP allocation information of the user equipment mapped to a connection port of the base station one-to-one.

* * * * *